United States Patent
Schrod et al.

(10) Patent No.: US 8,461,794 B2
(45) Date of Patent: Jun. 11, 2013

(54) METHOD AND APPARATUS FOR CONTROLLING OF A SERVO-DRIVE

(75) Inventors: Walter Schrod, Regensburg (DE); Christian Tump, München (DE)

(73) Assignee: Continental Automotive GmbH, Hannover (DE)

( * ) Notice: Subject to any disclaimer, the term of this patent is extended or adjusted under 35 U.S.C. 154(b) by 286 days.

(21) Appl. No.: 12/991,813

(22) PCT Filed: May 5, 2009

(86) PCT No.: PCT/EP2009/055382
§ 371 (c)(1),
(2), (4) Date: Dec. 8, 2010

(87) PCT Pub. No.: WO2009/135824
PCT Pub. Date: Nov. 12, 2009

(65) Prior Publication Data
US 2011/0181228 A1  Jul. 28, 2011

(30) Foreign Application Priority Data
May 9, 2008  (DE) .................. 10 2008 022 947

(51) Int. Cl.
*G05B 17/01* (2006.01)
*H02N 2/06* (2006.01)

(52) U.S. Cl.
USPC ............ 318/671; 318/430; 318/432; 318/630

(58) Field of Classification Search
USPC ................. 318/671, 430, 431, 432, 135, 115, 318/630; 137/554; 361/93.9
See application file for complete search history.

(56) References Cited

U.S. PATENT DOCUMENTS

| | | | | | |
|---|---|---|---|---|---|
| 3,752,193 | A | * | 8/1973 | Bader | 137/829 |
| 4,201,164 | A | * | 5/1980 | duPont | 123/406.67 |

(Continued)

FOREIGN PATENT DOCUMENTS

| | | |
|---|---|---|
| DE | 19814594 A1 | 10/1999 |
| DE | 10114421 A1 | 10/2002 |

(Continued)

OTHER PUBLICATIONS

Notification of Transmittal of Translation of the International Preliminary Report on Patentability (Chapter I or Chapter II of the Patent Cooperation Treaty), PCT/EP2009/055382, 7 pages, Dec. 16, 2010.

(Continued)

*Primary Examiner* — Paul Ip
(74) *Attorney, Agent, or Firm* — King & Spalding L.L.P.

(57) ABSTRACT

In a method and apparatus for controlling of a servo-drive, in particular of a solid state actuator in which the servo-drive is controlled during each control process by means of a two-point regulator (R2P), the two-point regulator (R2P) has a power signal (I) as control signal for actuation of the servo-drive. An upper switch point (PO) of the two-point controller (R2P) is allocated to one maximum power value (ÎOn) and a lower switch point (PU) of the two-point controller (R2P) is allocated to one minimum power value (ÎUm). The upper switch point (PO) and the lower switch point (PU) are established during the controlling process so that they are separated in pairs by at least a minimum default spacing (Dmin).

21 Claims, 3 Drawing Sheets

U.S. PATENT DOCUMENTS

| | | | | |
|---|---|---|---|---|
| 4,266,261 | A * | 5/1981 | Streit et al. | 361/154 |
| 5,723,079 | A * | 3/1998 | Fujita et al. | 264/40.7 |
| 6,147,433 | A * | 11/2000 | Reineke et al. | 310/316.03 |
| 6,895,997 | B2 * | 5/2005 | Qu et al. | 137/554 |
| 7,244,007 | B2 * | 7/2007 | Ishizaki | 347/5 |
| 7,372,187 | B2 | 5/2008 | Augesky | 310/316.03 |
| 7,850,265 | B2 * | 12/2010 | Ishizaki | 347/9 |
| 7,997,671 | B2 * | 8/2011 | Ishizaki | 347/9 |
| 8,184,420 | B2 * | 5/2012 | Lee et al. | 361/93.9 |
| 2004/0016461 | A1 * | 1/2004 | Qu et al. | 137/554 |
| 2005/0231179 | A1 * | 10/2005 | Ishizaki | 323/234 |
| 2006/0238949 | A1 | 10/2006 | Cheever, Jr. | 361/139 |
| 2007/0079710 | A1 * | 4/2007 | Ishizaki | 101/189 |
| 2008/0088262 | A1 | 4/2008 | Bolz | 318/116 |
| 2010/0045244 | A1 | 2/2010 | Fuchs et al. | 320/166 |
| 2010/0165533 | A1 * | 7/2010 | Lee et al. | 361/93.9 |
| 2011/0002486 | A1 * | 1/2011 | Ishizaki | 381/190 |

FOREIGN PATENT DOCUMENTS

| | | |
|---|---|---|
| DE | 102004009614 | 9/2005 |
| DE | 102005016279 A1 | 10/2006 |
| DE | 102007014326 A1 | 10/2008 |
| WO | 9917009 | 4/1999 |

OTHER PUBLICATIONS

International Search Report and Written Opinion for Application No. PCT/EP2009/055382 (13 pages), Jul. 17, 2009.

* cited by examiner

METHOD AND APPARATUS FOR CONTROLLING OF A SERVO-DRIVE

CROSS-REFERENCE TO RELATED APPLICATIONS

This application is a U.S. National Stage Application of International Application No. PCT/EP2009/055382 filed May 5, 2009, which designates the United States of America, and claims priority to German Application No. 10 2008 022 947.4 filed May 9, 2008, the contents of which are hereby incorporated by reference in their entirety.

TECHNICAL FIELD

The invention relates to a method and an apparatus for controlling a servo-drive, in particular a solid-state actuator.

BACKGROUND

The controlling of servo-drives, in particular of solid-state actuators, places considerable demands on the servo-drive. For example, for charging and discharging, high voltages and high currents have to be provided for short periods of time. The servo-drive can be charged or discharged in less than a millisecond. In this time, a controller controlling the servo-drive should supply electrical energy to or remove electrical energy from the servo-drive in a controlled and reproducible manner.

Solid-state actuators are used in injection valves. Injection valves are used in internal combustion engines for injecting fuel into a combustion chamber. The solid-state actuator opens or closes the injection valve depending on a voltage applied in each case.

Document DE 198 14 594 A1 discloses a piezoelectric element in which a charging process or a discharging process is terminated a certain time before a desired voltage is attained in the piezoelectric element. As a consequence of the charge or discharge current not dropping abruptly to zero, the piezoelectric element continues to be charged or discharged for a certain time after termination of the charging or discharging.

Document DE 10 2005 016 279 A1 discloses a circuit arrangement for actuating a rechargeable and dischargeable electromechanical actuator, especially for a fuel injection valve of an internal combustion engine. The charged actuator is discharged by means of a first discharge branch which is connected to the actuator. The actuator is also discharged by means of a second discharge branch which is connected to the actuator. The second discharge branch is triggered by means of a controller to discharge the actuator after the first discharge branch while the first discharge branch is still discharging the actuator.

Document DE 10 2004 047 961 A1 discloses a device comprising a DC/DC converter, said DC/DC converter supplying at the output end a high supply voltage which is applied to a series connection encompassing a high-side switching transistor and a low-side switching transistor. A series connection comprising a high-inductance coil and a piezoactuator that is to be triggered is disposed between a junction of the two switching transistors and a reference potential. An excitation signal having a predefined pulse duty factor (effective voltage) and a predefined switching frequency is applied to the junction in order to charge or discharge the piezoactuator.

Document DE 10 2004 009 614 A1 discloses a piezoelectric actuator of an injection valve which is controlled by application of a control curve on which the maximum amplitudes of the current controlling the actuator are given. A slowly rising or falling charge course at the beginning or end of a charging or discharging phase and hence a charge level that is linearly controllable over time can thus be achieved in the actuator.

Document DE 101 14 421 A1 discloses a capacitive actuator element, in particular a piezoelectric actuator. The piezoelectric actuator is charged or discharged with a control current regulated to a constant average value until such time as a predefined voltage applies to the actuator element. This charging or discharging process results in a stroke motion through a stroke that is dependent on the control current. A variable that is dependent on the charge of the actuator element is recorded as the controlled variable. The controlled variable is preferably also dependent on the control current. In that the controlled variable is adjusted to a reference variable by controlling the control current, the time course of the controlled variable is predefined such that a predefined time course of the stroke is achieved by controlling the controlled variable.

Document DE 10 2007 014 326 A1 discloses a controllable switch which in order to charge and/or discharge a capacitive element is triggered to interrupt a charging current. The controllable switch is triggered when the charging current exceeds a predetermined charging-current threshold. The charging-current threshold is altered while the capacitive element is being charged to the predefined charging voltage. The controllable switch is triggered again in order to couple the charging current into the capacitive element if a predefined period of time after a previous triggering of the controllable switch has elapsed and/or the charging current drops below the predetermined charging-current threshold.

SUMMARY

According to various embodiments, a method and an apparatus can be provided for controlling a servo-drive, in particular a solid-state actuator, which enables reliable control of the servo-drive in a simple manner.

According to an embodiment, in a method for controlling a servo-drive, in particular a solid-state actuator, the servo-drive is controlled during each control process by means of a two-position controller whose control signal is a current signal for actuation of the servo-drive and whose upper switching point is assigned one maximum current value and whose lower switching point is assigned one minimum current value, which during the control process are predefined such that they are separated in pairs by at least a predefined minimum interval, and the respective minimum current value during a predefined first time period is increased during the respective control process from a predefined first minimum value to a predefined first maximum value, wherein the predefined first maximum value is greater than the predefined first minimum value.

According to a further embodiment, the respective minimum current value during a second predefined time period may be predefined such that it is greater than or equal to the maximum value. According to a further embodiment, the respective minimum current value during a third predefined time period may be reduced from a predefined further maximum value to a predefined further minimum value, wherein the predefined further minimum value is less than the predefined further maximum value. According to a further embodiment, the respective minimum current value may lie on a lower envelope curve and the respective maximum current value lies on an upper envelope curve, wherein the lower envelope curve and the upper envelope curve are each predefined by a constant function. According to a further embodiment, the respectively constant function can be formed from differentiable function sections, the functional course of which is in each case linear. According to a further embodiment, either the upper envelope curve or the lower envelope curve may be predefined such that each predefined envelope curve is mapped by means of a further predefined function onto the other envelope curve respectively.

According to another embodiment, an apparatus for controlling a servo-drive, in particular a solid-state actuator, may be designed to control the servo-drive during one control process by means of a two-position controller whose control signal is a current signal for actuation of the servo-drive and whose upper switching point is assigned to one maximum current value and whose lower switching point is assigned to one minimum current value, which during the control process are predefined such that they are separated in pairs by at least a predefined minimum interval, and the respective minimum current value during a predefined first time period is increased during the respective control process from a predefined first minimum value to a predefined first maximum value, wherein the predefined first maximum value is greater than the predefined first minimum value.

BRIEF DESCRIPTION OF THE DRAWINGS

Exemplary embodiments are illustrated in detail below with the aid of schematic drawings, in which.

Elements having the same design or function are labeled in all the figures with the same reference characters.

DETAILED DESCRIPTION

According to various embodiments, in a method and an apparatus for controlling a servo-drive, in particular a solid-state actuator, the servo-drive is controlled during each control process by means of a two-position controller. The control signal of the two-position controller is a current signal for actuation of the servo-drive. One maximum current value is assigned to an upper switching point of the two-position controller and one minimum current value is assigned to a lower switching point of the two-position controller. The upper switching point and the lower switching point are predefined during the control process such that they are separated in pairs by at least a predefined minimum interval. The respective minimum current value is increased during a predefined first time period during the respective control process from a predefined first minimum value to a predefined first maximum value. The predefined first maximum value is greater than the predefined first minimum value.

This enables control of the two-position controller in its operating range and thus stable closed-loop control. Furthermore, an advantageous electromagnetic design of the two-position controller is enabled by limiting switching frequencies of the two-position controller. This also enables during the first predefined time period reliable charging or discharging of the servo-drive in which overshoots are avoided.

In an embodiment, the respective minimum current value during a second predefined time period is predefined such that it is greater than or equal to the maximum value. This enables fast charging or discharging of the servo-drive.

According to a further embodiment, the respective minimum current value during a third predefined time period is reduced from a predefined further maximum value to a predefined further minimum value. The predefined further minimum value is less than the predefined further maximum value. This enables during the third predefined time period reliable charging or discharging of the servo-drive in which overshoots are avoided.

In a further embodiment, the respective minimum current value lies on a lower envelope curve and the respective maximum current value lies on an upper envelope curve, the lower envelope curve and the upper envelope curve each being predefined by a constant function. This enables simple and reliable predefinition of the lower envelope curve and the upper envelope curve.

According to a further embodiment, the respective constant function is formed from differentiable function sections, the functional course of which is in each case linear. This enables a reproducible predefinition of the lower envelope curve and the upper envelope curve.

In a further embodiment, either the upper envelope curve or the lower envelope curve is predefined such that the respectively predefined envelope curve is mapped by means of a further predefined function onto the other respective envelope curve. This enables a simple design of the two-position controller in which the course of an envelope curve is sufficient for predefining the course of the other envelope curve by means of the further predefined function.

Figure 1:
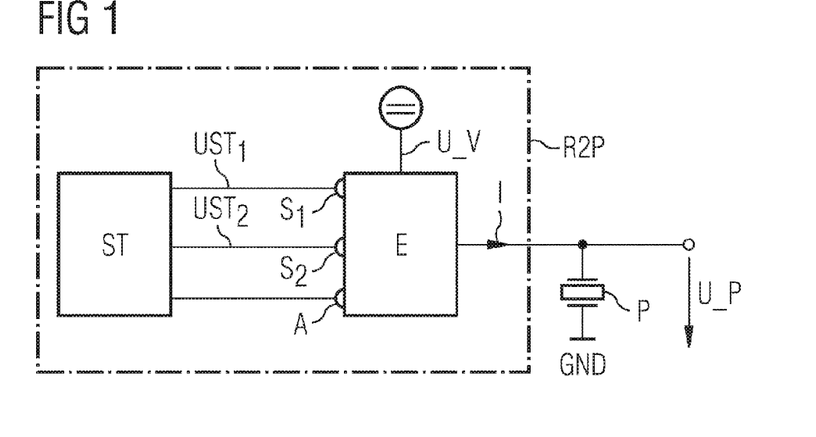
FIG. 1 shows a servo-drive and an apparatus for operating a servo-drive.

FIG. 1 shows an apparatus for controlling a servo-drive, and a servo-drive which is embodied as a solid-state actuator P. The apparatus comprises a controller which is embodied as a two-position controller R2P. The servo-drive embodied as a solid-state actuator P is based, for example, on the piezo principle, but may, for example, also be based on the principle of magnetostriction or on a further principle which is known to the relevant person skilled in the art for use as a solid-state actuator P.

The two-position controller R2P regulates a current signal I, via which the solid-state actuator P is charged or discharged. The two-position controller R2P comprises an output stage E, a control unit ST and a voltage source for providing a supply voltage U_V. The time course of the current signal I which is emitted via the output stage E to the solid-state actuator P is controlled by means of the control unit ST. The solid-state actuator P is coupled to a reference potential GND, which is, for example, a ground potential. To determine a working point of the solid-state actuator P, an actuator voltage U_P across the solid-state actuator P can be determined.

To control the solid-state actuator P via the output stage E, the control unit ST is coupled to the output stage E via a first switch S1 and a second switch S2. The first switch S1 is controlled by means of a first control signal UST1 and the second switch S2 is controlled by means of a second control signal UST2. The first switch S1 and the second switch S2 may, for example, each be a transistor. An ammeter A is assigned to the output stage E such that it records the current signal I between the output stage E and the solid-state actuator P. The control unit ST is also coupled to the ammeter A. This enables the control unit ST to determine the current signal I between the output stage E and the solid-state actuator P.

Figure 2:
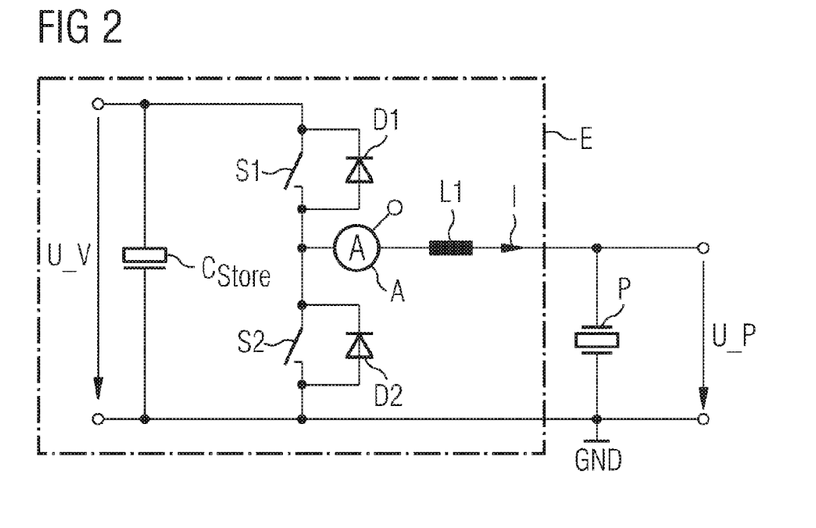
FIG. 2 shows an output stage of a two-position controller and a servo-drive.

FIG. 2 shows an embodiment of the output stage E coupled to the solid-state actuator P, which here is embodied in a buck-boost topology. The output stage E can also be embodied in a different topology as a switching actuator, for example as a flyback or SEPIC converter.

The level of the supply voltage U_V is dependent on the topology of the output stage E. If the output stage E is embodied, for example, by means of the buck-boost topology, the output stage E functions as a buck converter. In this case, the supply voltage U_V is greater than or equal to the threshold voltage U_TH up to which the solid-state actuator P is charged. If the output stage E is embodied in a different topology, for example as a boost converter, then the supply voltage U_V is less than or equal to the threshold voltage U_TH.

In the embodiment shown of the output stage E as a buck-boost converter, the output stage E comprises a supply capacitor CStore, the first and the second switch S1 and S2, a first and a second diode D1 and D2 and an inductor L1. Furthermore, the ammeter A is assigned to the output stage E. The supply voltage U_V is provided via the supply capacitor CStore. The supply capacitor CStore is coupled to the first and the second switch S1 and S2, as well as to the first and the second diode D1 and D2, the first diode D1 being switched in parallel to the first switch S1 and the second diode D2 being switched in parallel to the second switch S2. The ammeter A is coupled firstly to the first switch S1, the second switch S2, the first diode D1 and the second diode D2 and secondly to the inductor L1. The current signal I for charging or discharging the solid-state actuator P flows through the inductor L1.

To charge the solid-state actuator P, the first switch S1 is controlled by means of the control unit ST via the first control signal UST1. For discharging, the second switch S2 is controlled by means of the control unit ST via the second control signal UST2. The value of the current signal I is recorded by means of the ammeter A and transmitted to the control unit ST.

Figure 3:
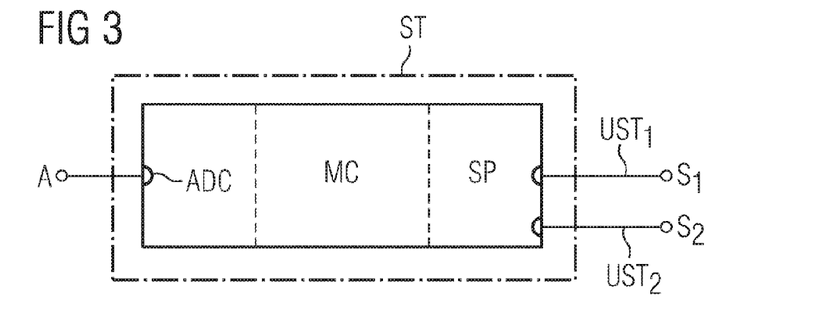
FIG. 3 shows a first control unit.

FIG. 3 shows an embodiment of the control unit ST. The control unit ST can be coupled directly to the first switch S1 and to the second switch S2. However, it can for example also be coupled to the first switch S1 and the second switch S2 via one driver stage in each case (not shown here). The control unit ST comprises for example a microcontroller MC having an analog-digital converter ADC and an interface SP. The control unit ST determines the digitalized current signal I via the analog-digital converter ADC.

Depending on the value of the current signal I, the first and the second switch S1 and S2 are switched on or switched off via the interface SP by means of the first control signal UST1 and the second control signal UST2 respectively. For this purpose, an upper switching point PO and a lower switching point PU respectively are predefined for the control unit ST. The upper switching point PO defines in each case a maximum current value ÎOn at which the first switch S1 or the second switch S2 is opened by the control unit ST such that the current signal I emitted by the output stage E does not exceed the maximum current value ÎOn predefined in each case. The lower switching point PU defines in each case a minimum current value ÎUm at which the first switch S1 or the second switch S2 is closed such that the current signal I emitted by the output stage E to the solid-state actuator P subsequently increases.

The maximum current value ÎOn assigned to the upper switching point PO in each case can be predefined such that it alters over time. The minimum current value ÎUm assigned to the lower switching point PU in each case can likewise be altered over time. For example, a time course of the upper switching point PO and of the lower switching point PU can be predefined by means of a characteristics map which is stored in a memory of the microcontroller MC. This enables easy retrieval of the characteristics map by the microcontroller MC, as a result of which the upper switching point PO and the lower switching point PU can easily be determined.

The sequence of a charging process of the solid-state actuator P is represented schematically in FIG. 4 and will be explained in detail below with reference to the flow diagram shown.

Figure 4:
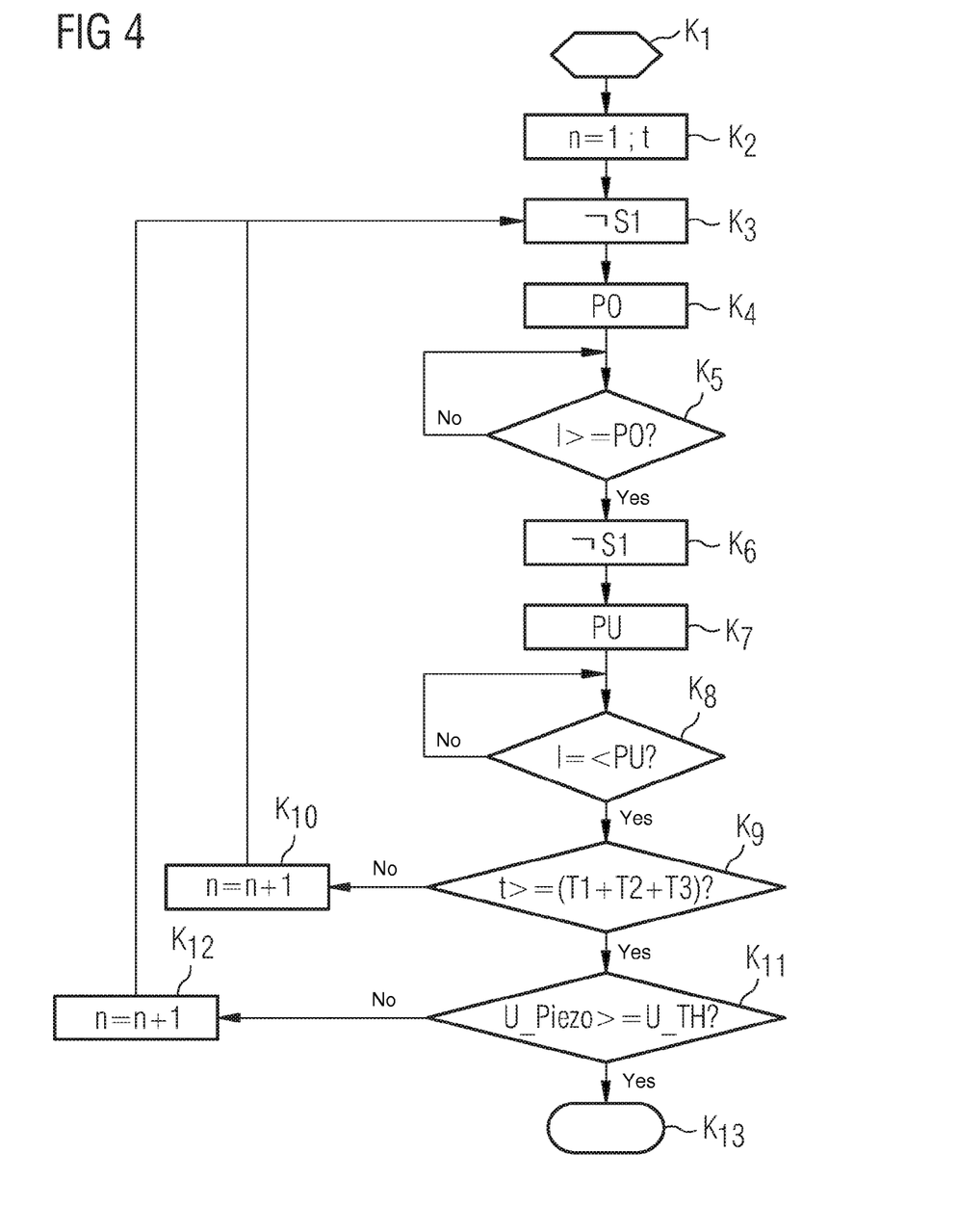
FIG. 4 shows a flow diagram of a program for controlling a servo-drive.

FIG. 4 shows the sequence of the charging process of the solid-state actuator P with the aid of a program consisting of the program steps K1 to K13. The charging is started in a first program step K1.

In a second program step K2, variables are initialized. To illustrate the sequence, the number of switching cycles of the first switch S1 is represented by the variable n. A maximum current value ÎOn and a minimum current value ÎUn are assigned to each switching cycle n, for example, ÎO5 and ÎU5 for the fifth switching cycle.

Furthermore, a time is assigned to the start of charging. This is indicated here by the variable t. By determining a further time, it is possible in the further course of the program for a time period, for example the time period which the program has needed until a respective switching cycle n is reached, to be determined.

In a third program step K3, the switch position of the first switch S1 is inverted. If the first switch S1 was, for example, previously open, then in the third program step it is closed and vice versa. Closing the first switch S1 results in an increase in the current signal I which charges the solid-state actuator P via the inductor L1 such that the actuator voltage U_P increases. In a fourth program step K4, the upper switching point PO is determined. This is made possible, for example, by the control unit ST accessing a stored characteristics map which predefines the course of the upper switching point over time.

The program remains in a fifth program step K5 until such time as the current signal I has a value which is greater than or equal to the maximum current value ÎOn predefined by the upper switching point. If that is the case, then in a sixth program step K6 the switch position of the first switch S1 is again inverted. The first switch S1 is, for example, opened. In a seventh program step K7, the time of the lower switching point PU is determined by the control unit ST. This is achieved, for example, by the control unit ST accessing a characteristics map.

In an eighth program step K8, it is determined whether the current signal I has a value which is less than or equal to a minimum current value ÎUm assigned to the lower switching point PU. Only if this condition is fulfilled does the program switch to a ninth program step K9. In the ninth program step K9, it is determined whether the time period which has elapsed since the start of charging is greater than or equal to a predefined target time period which corresponds to the duration of the entire control process. For example, the predefined target duration of the entire control process may be composed of a first predefined time period T1, a second predefined time period T2 and a third predefined time period T3. The predefined target duration of the entire control process may, however, also be composed, for example, of an arbitrary number of further predefined time periods.

In the event that the predefined target duration of the entire control process has not yet been reached, the program starts a next switching cycle n to control the first switch S1. Entry into the next switching cycle n is indicated by the incrementation of n in a tenth program step K10.

In the event that the time period of the predefined entire control process has elapsed, the program begins execution of an eleventh program step K11. To this end, the drop in the actuator voltage U_P across the solid-state actuator P is determined. The predefined threshold voltage U_TH is also determined. If the value of the drop in the actuator voltage U_P across the solid-state actuator P is greater than or equal to the value of the predefined threshold voltage U_TH, then the program ends in a thirteenth program step K13. If this is not the case, then the program begins a next switching cycle n by incrementing n in a twelfth program step K12 and subsequently repeating execution of program step K3.

Figure 5:
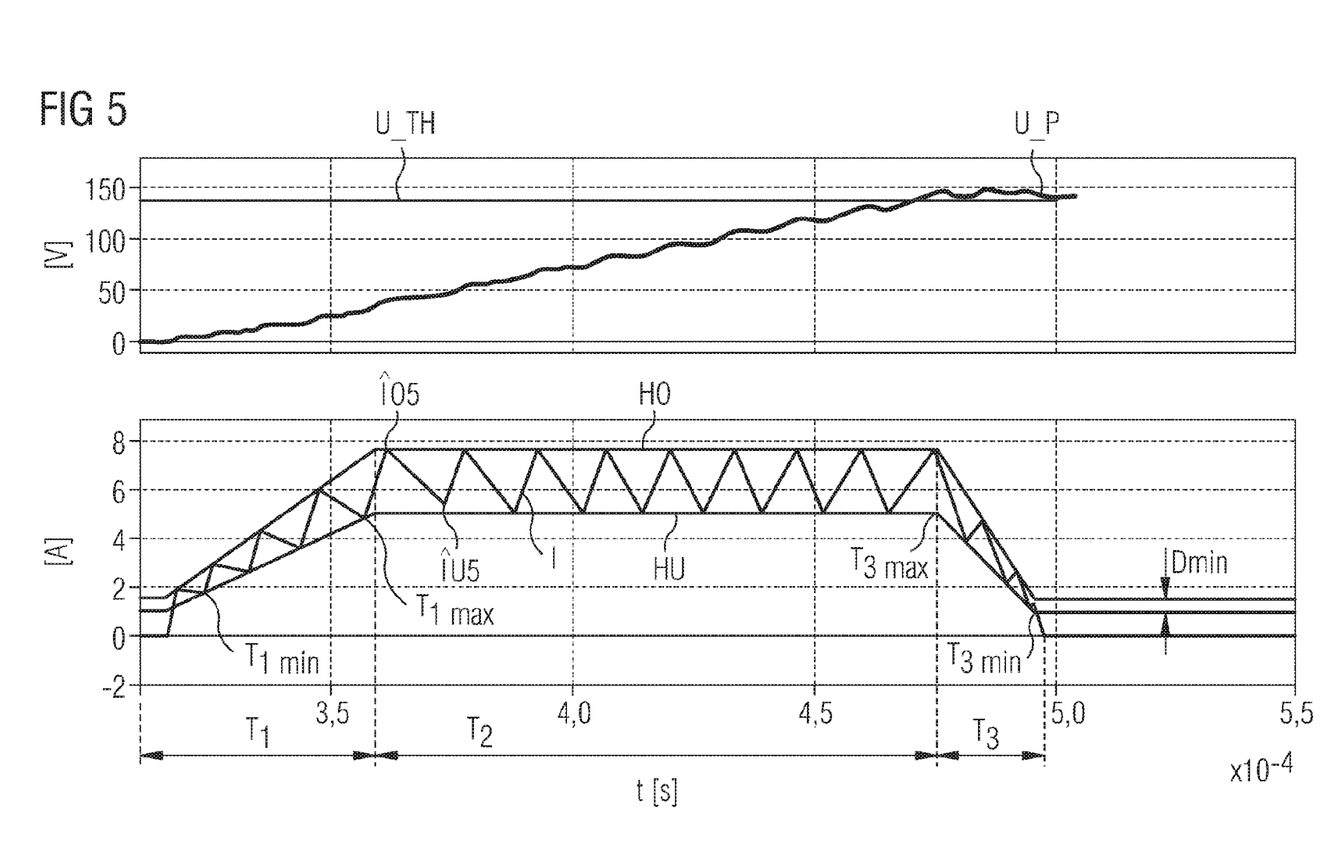
FIG. 5 shows a current course and a voltage course of a charging process for a servo-drive.

FIG. 5 shows a time course of the current signal I and of the actuator voltage U_P, as may occur during charging of the solid-state actuator P.

If the solid-state actuator P is fully discharged, then no actuator voltage U_P is being applied across the solid-state actuator P. The actuator voltage U_P increases during charging of the solid-state actuator P depending on the current signal I. If the solid-state actuator P is fully charged, then the actuator voltage U_P is greater than or equal to the threshold value of the threshold voltage U_TH.

The course of the current signal I is predefined by the upper and the lower switching point PO and PU which impose an upper envelope curve HO and a lower envelope curve HU on the current signal I. The respective maximum current value $\hat{I}On$ of the current signal I lies on the upper envelope curve HO and the respective minimum current value $\hat{I}Um$ of the current signal I lies on the lower envelope curve HU. Examples of the respective maximum current value $\hat{I}On$ and of the respective minimum current value $\hat{I}Um$ are the fifth maximum current value $\hat{I}O5$ and the fifth minimum current value $\hat{I}U5$ plotted in FIG. 5.

The maximum current value $\hat{I}On$ assigned to the respective upper switching point PO and the minimum current value $\hat{I}Um$ assigned to the respective lower switching point PU are predefined during the entire control process such that they are separated in pairs by at least a predefined minimum interval Dmin. The predefined minimum interval Dmin is embodied such that the two-position controller R2P can be operated in its working range.

As a consequence, the two-position controller is in a stable and defined condition during the entire control process. This enables a robust and reproducibly functioning design of the two-position controller R2P. The switching frequency between the upper switching point PO and the lower switching point PU is limited. High switching frequencies are reliably avoided and an electromagnetically compatible design of the servo-drive is enabled. Furthermore, the predefined minimum interval Dmin makes it possible to dispense with the need to impress a starting pulse at the start of charging or discharging.

The predefined value for the minimum interval Dmin may be predefined relative to the maximum current signal I. Dmin may, for example, lie in a range between 10 and 30 percent of the maximum current signal I. Depending on the two-position controller R2P used, however, it may also be possible for a value from a different value range to be predefined for the minimum interval Dmin.

In an embodiment, only one of the two envelope curves is predefined in each case and a function is also predefined. The other envelope curve in each case can easily be mapped by means of the function and the first envelope curve. For example, it is sufficient if the two-position controller R2P predefines exclusively the respective minimum current value $\hat{I}Um$ by means of the respective lower switching point PU. The respective upper switching point PO with the respectively assigned maximum current value $\hat{I}Um$ can be derived therefrom by means of the function. The function may, for example, be a factor by means of which, for example, the first envelope curve can be mapped onto the other envelope curve respectively.

In an embodiment, the control process for the solid-state actuator P extends over three time periods. During the predefined first time period T1, the respective minimum current value $\hat{I}Um$ is increased during the respective control process from a predefined first minimum value T1min to a predefined first maximum value T1max, the predefined first minimum value T1max being greater than the predefined first minimum value T1min. During the second predefined time period T2, the respective minimum current value $\hat{I}Um$ is predefined such that it is greater than or equal to the maximum value T1max. During the third predefined time period T3, the respective minimum current value $\hat{I}Um$ is reduced from a predefined further maximum value T3max to a predefined further minimum value T3min, the predefined further minimum value T3min being less than the predefined further maximum value T3max.

The current signal I comprises an alternating-current component and a direct-current component. The predefined course of minimum current values $\hat{I}Um$ over time means that the direct-current component is large in comparison to the alternating-current component. This makes it possible to design the control process for the solid-state actuator P such that any power loss occurring in the solid-state actuator P is small.

In order to reduce further the power loss in the solid-state actuator P, a low-pass filter, for example, can be connected between the output stage E and the solid-state actuator P, which is not shown here. The smaller the alternating-current component in the current signal I in comparison to the direct-current component, the simpler the design of the interposed low-pass filter can be.

In the embodiment shown in FIG. 5, the charging lasts for 200 microseconds, the solid-state actuator P being charged up in this time to a voltage of approximately 150 volts. The duration of the charging may also deviate from the embodiment shown. For example, it is conceivable that the entire charging control process will be carried out in under 100 microseconds. In this case, for example, a complete charging and discharging of the solid-state actuator P can be carried out in a period of under 200 microseconds. The course of the actuator voltage U_P may in other embodiments deviate with regard to its time course from the embodiment shown here. It is also possible that the predefined threshold voltage U_TH will have a different value.

The predefining of values, for example for the predefined first time period T1, the predefined second time period T2 and predefined third time period T3, is based on the working point at which the solid-state actuator P is to be operated. If, for example, the predefined second time period T2 is shortened, then the drop in the actuator voltage U_P in the solid-state actuator P at the end of the predefined third time period T3 will be less. The drop in the actuator voltage U_P across the solid-state actuator P at the end of charging also depends, for example, on the predefined first maximum value T1max. The greater the predefined first maximum value T1max and the predefined further maximum value T3 max, the greater the direct-current component of the current signal I, which leads to faster charging of the solid-state actuator P.

The control process of the servo-drive has been explained by way of example by illustrating the charging of the solid-state actuator P. To this end, FIG. 3 shows an embodiment of the control unit ST which controls, for example, the charging of the solid-state actuator P. FIG. 4 shows the flow diagram assigned to the charging, and the assigned current course and the voltage course are shown in FIG. 5.

The discharging of the solid-state actuator P is analogous to the charging and is also controlled by the control unit ST. The flow diagram for discharging of the solid-state actuator P corresponds to the flow diagram shown in FIG. 4, with the difference that to discharge the solid-state actuator P in program steps K3 and K6 the second switch S2 is controlled instead of the first switch S1. Furthermore, in the eleventh program step K11 it is determined whether the actuator voltage U_P has reached a value at which the solid-state actuator P is fully discharged. This may, for example, be 0 volts. The time course of the current signal I during discharging corresponds to the time course of the current signal I during charging of the solid-state actuator P, with the difference that the direction of the current flow changes. During discharging, the direction of the current signal I no longer corresponds to the direction shown in FIG. 1, but points from the solid-state actuator P to the output stage E. The time course of the actuator voltage U_P during discharging differs from the time course for charging shown in FIG. 5 in that the actuator voltage U_P is reduced from a value that corresponds to the working point of the solid-state actuator P to a value at which the solid-state actuator P is fully discharged. This may, for example, be the case at 0 V.

What is claimed is:

1. A method for controlling a servo-drive in which the servo-drive is controlled during each control process by means of a two-position controller whose control signal is a current signal for actuation of the servo-drive, the method comprising:
    storing a program for controlling a charging of the servo-drive, the program defining a succession of switching point pairs, each pair defining an upper switching point and a lower switching point,
    wherein for each switching point pair, the upper switching point is assigned one maximum current value and the lower switching point is assigned one minimum current value, wherein the upper and lower switching points are separated by a predefined minimum interval,
    wherein the respective minimum current value defining the lower switching point in each switching point pair increases throughout the succession of switching point pairs, and
    for a predefined first time period, alternatively switching a switch between an open, charging position in which the servo-drive is charged and a closed, discharging position in which the servo-drive is discharged, according to the succession of switching point pairs, such that each upper switching point triggers a switch from the open, charging position to the closed, discharging position, and each lower switching point triggers a switch from the closed, discharging position to the open, charging position.

2. The method according to claim 1, wherein the respective minimum current value during a second predefined time period is predefined such that it is greater than or equal to the maximum value.

3. The method according to claim 1, wherein the respective minimum current value during a third predefined time period is reduced from a predefined further maximum value to a predefined further minimum value, wherein the predefined further minimum value is less than the predefined further maximum value.

4. The method according to claim 1, wherein the respective minimum current value lies on a lower envelope curve and the respective maximum current value lies on an upper envelope curve, wherein the lower envelope curve and the upper envelope curve are each predefined by a constant function.

5. The method according to claim 4, wherein the respectively constant function is formed from differentiable function sections, the functional course of which is in each case linear.

6. The method according to claim 4, wherein either the upper envelope curve or the lower envelope curve is predefined such that each predefined envelope curve is mapped by means of a further predefined function onto the other envelope curve respectively.

7. The method according to claim 1, wherein the servo drive is a solid-state actuator.

8. The method according to claim 1, wherein the predefined minimum interval separating the upper and lower switching points of each switching point pair increases throughout the succession of switching point pairs.

9. An apparatus for controlling a servo-drive comprising:
    a two-position controller being operable to control the servo-drive during one control process,
    the two-position controller storing a program for controlling a charging of the servo-drive, the program defining a succession of switching point pairs, each pair defining an upper switching point and a lower switching point,
    wherein for each switching point pair, the upper switching point is assigned one maximum current value and a the lower switching point is assigned one minimum current value,
    wherein the respective minimum current value defining the lower switching point in each switching point pair increases throughout the succession of switching point pairs, and
    wherein the two-position controller is configured to charge of the servo-drive by alternatively switching a switch between an open, charging position in which the servo-drive is charged and a closed, discharging position in which the servo-drive is discharged, according to the succession of switching point pairs, such that each upper switching point triggers a switch from the open, charging position to the closed, discharging position, and each lower switching point triggers a switch from the closed, discharging position to the open, charging position.

10. The apparatus according to claim 9, wherein the servo drive is a solid-state actuator.

11. The apparatus according to claim 9, wherein the respective minimum current value during a second predefined time period is predefined such that it is greater than or equal to the maximum value.

12. The apparatus according to claim 9, wherein the respective minimum current value during a third predefined time period is reduced from a predefined further maximum value to a predefined further minimum value, wherein the predefined further minimum value is less than the predefined further maximum value.

13. The apparatus according to claim 9, wherein the respective minimum current value lies on a lower envelope curve and the respective maximum current value lies on an upper envelope curve, wherein the lower envelope curve and the upper envelope curve are each predefined by a constant function.

14. The apparatus according to claim 13, wherein the respectively constant function is formed from differentiable function sections, the functional course of which is in each case linear.

15. The apparatus according to claim 13, wherein either the upper envelope curve or the lower envelope curve is predefined such that each predefined envelope curve is mapped by means of a further predefined function onto the other envelope curve respectively.

16. An system comprising:
a solid-state actuator,
a two-position controller coupled with the solid-state actuator to control the solid-state actuator, wherein the two-position controller provides a current control signal for actuation of the solid-state actuator,
the two-position controller storing a program for controlling a charging of the solid-state actuator, the program defining a succession of switching point pairs, each pair defining an upper switching point and a lower switching point,
wherein for each switching point pair, the upper switching point is assigned one maximum current value and a the lower switching point is assigned one minimum current value,
wherein the respective minimum current value defining the lower switching point in each switching point pair increases throughout the succession of switching point pairs, and
wherein the two-position controller is configured to charge of the solid-state actuator by alternatively switching a switch between an open, charging position in which the solid-state actuator is charged and a closed, discharging position in which the solid-state actuator is discharged, according to the succession of switching point pairs, such that each upper switching point triggers a switch from the open, charging position to the closed, discharging position, and each lower switching point triggers a switch from the closed, discharging position to the open, charging position.

17. The system according to claim 16, wherein the respective minimum current value during a second predefined time period is predefined such that it is greater than or equal to the maximum value.

18. The system according to claim 16, wherein the respective minimum current value during a third predefined time period is reduced from a predefined further maximum value to a predefined further minimum value, wherein the predefined further minimum value is less than the predefined further maximum value.

19. The system according to claim 16, wherein the respective minimum current value lies on a lower envelope curve and the respective maximum current value lies on an upper envelope curve, wherein the lower envelope curve and the upper envelope curve are each predefined by a constant function.

20. The system according to claim 19, wherein the respectively constant function is formed from differentiable function sections, the functional course of which is in each case linear.

21. The system according to claim 19, wherein either the upper envelope curve or the lower envelope curve is predefined such that each predefined envelope curve is mapped by means of a further predefined function onto the other envelope curve respectively.

* * * * *